United States Patent [19]
Maddox

[11] Patent Number: 5,440,142
[45] Date of Patent: Aug. 8, 1995

[54] SYSTEM AND METHOD FOR TESTING BARCODE SCANNER WINDOW VIABILITY

[75] Inventor: Craig E. Maddox, Lilburn, Ga.

[73] Assignee: AT&T Global Information Solutions Company, Dayton, Ohio

[21] Appl. No.: 193,825

[22] Filed: Feb. 9, 1994

[51] Int. Cl.6 .................................................. G06K 7/10
[52] U.S. Cl. ................... 250/566; 250/559.06; 235/437; 356/239
[58] Field of Search ............... 250/566, 568, 562, 572; 235/437, 462, 467, 470; 356/239

[56] References Cited

U.S. PATENT DOCUMENTS

| | | | |
|---|---|---|---|
| 3,995,166 | 11/1976 | Hobart et al. | 250/566 |
| 4,955,693 | 9/1990 | Bobba | 235/467 |
| 5,134,272 | 7/1992 | Tsuchiya et al. | 235/462 |

*Primary Examiner*—Stephone B. Allen
*Attorney, Agent, or Firm*—Paul W. Martin

[57] ABSTRACT

A system and method for testing bar code scanner window viability which determines whether the window is scratched or otherwise damaged enough to require replacement. The system includes a laser beam source. The laser beam passes through a window glass for scanning a bar code label. Light reflected from the bar code label passes through the window glass and is detected and converted into an electrical signal. Finally, a processor determines the bar code information from the electrical signal and determines whether the window glass is damaged enough that the bar code information cannot accurately be determined. The method determines the variance between the widths of the bars and spaces from a plurality of bar code scans and compares the variance to a predetermined threshold. The window glass is replaced when the threshold is exceeded.

10 Claims, 3 Drawing Sheets

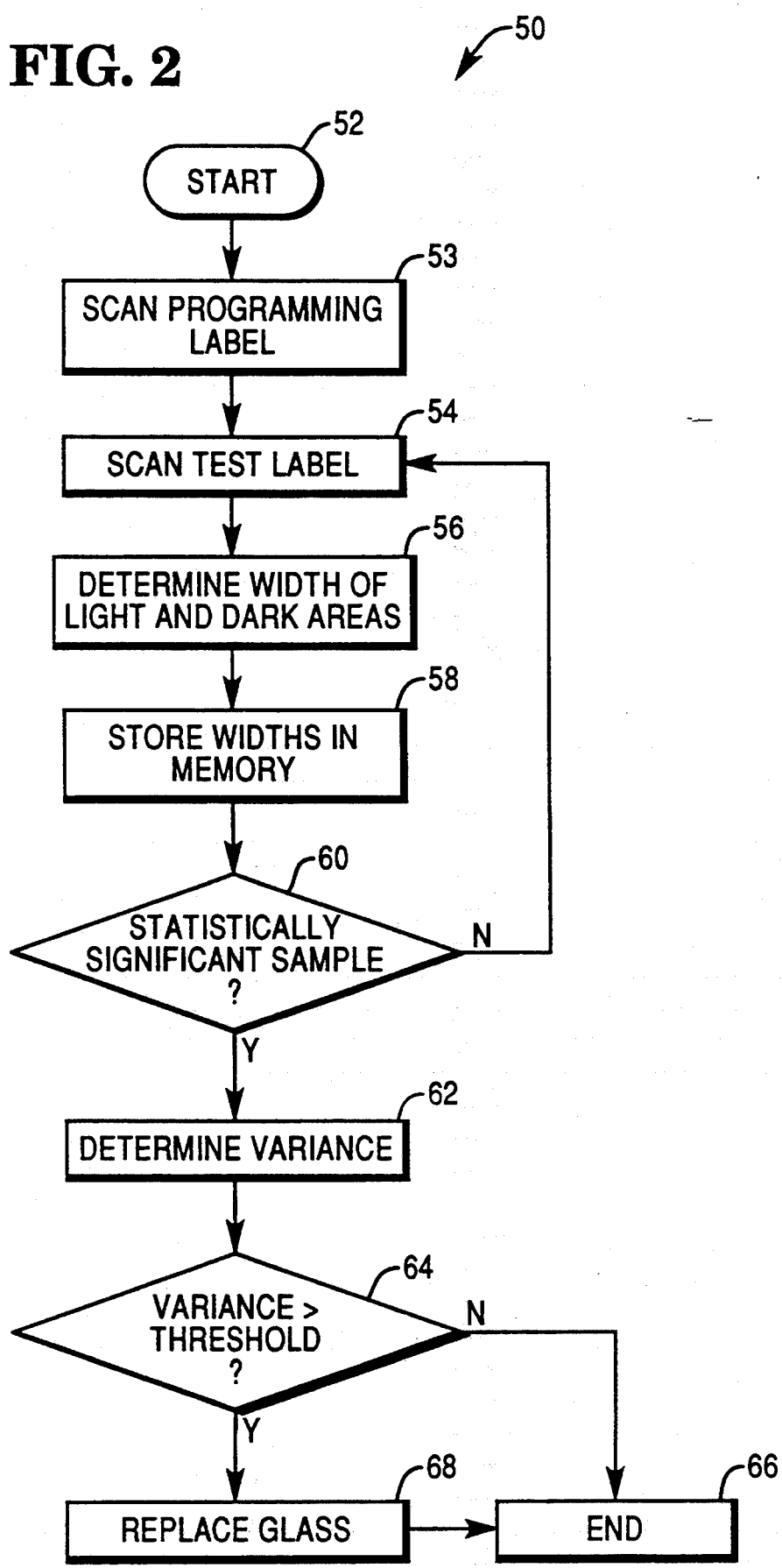

SYSTEM AND METHOD FOR TESTING BARCODE SCANNER WINDOW VIABILITY

BACKGROUND OF THE INVENTION

The present invention relates to bar code scanners, and more specifically to a system and method for testing bar code scanner window viability.

The window in a bar code scanner, through which a laser beam is emitted, can become scratched during normal use of the bar code scanner as products, such as cans, are dragged across the glass. Regular inexpensive glass suffers from a short life. When profusely scratched, the glass causes the performance of the scanner to diminish. Severity, position, and quantity of chips and scratches all have a bearing on the severity of the degradation.

One solution to the problem is to use sapphire glass. This type of glass is durable, but very expensive.

Therefore, it would be desirable to provide a system and method for testing bar code scanner window viability, which determines when a pane of glass requires changing.

SUMMARY OF THE INVENTION

In accordance with the teachings of the present invention, a system and method for testing bar code scanner window viability are provided. The window glass is susceptible to damage from items coming in contact with the window glass during scanning. The system includes a laser beam source, such as a laser diode. The laser beam passes through a window glass for scanning a programming bar code label for placing the system in a test mode and for scanning a test pattern label. The test pattern label is preferably placed face down on the window glass. Light reflected from the test pattern label passes through the window glass. A detector converts the reflected light into an electrical signal based on the intensity of the reflected light. Optics route the laser beam through the window glass and route the reflected light to the detector. Finally, a processor determines the test information from the reflected light and determines whether the window glass is damaged enough that bar code information cannot accurately be determined.

The method includes the steps of scanning and processing a programming bar code label to place the system into a test mode, scanning a test pattern label having dark and light areas a plurality of times, determining the widths of the light and dark areas for each scanning step, storing the widths of the light and dark areas in a memory for each scanning step, determining whether the widths represent a statistically significant sample, determining the variance of the widths, comparing the variance to a predetermined threshold, and indicating to an operator to replace the window glass if the variance exceeds the predetermined threshold.

In a first embodiment, the test pattern label is placed over the entire surface of the glass.

In another embodiment, a first area of the window glass through which the laser beam passes substantially always and a second area of the window glass through which the laser beam passes substantially never are identified, the test pattern label is placed over the first area by an operator, and damage to the window glass detected visually by the operator in the second area is disregarded.

It is accordingly an object of the present invention to provide a system and method for testing bar code scanner window viability.

It is another object of the present invention to provide a system and method for testing bar code scanner window viability which determines whether the degree of damage to the window is significant enough to prevent the scanning system from determining the information bar codes swiped across the window.

It is another object of the present invention to provide a system and method for testing bar code scanner window viability which is more accurate than a visual inspection of the window.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a flow diagram of the method for testing bar code scanner window viability.

DETAILED DESCRIPTION OF THE PREFERRED EMBODIMENT

Figure 1:
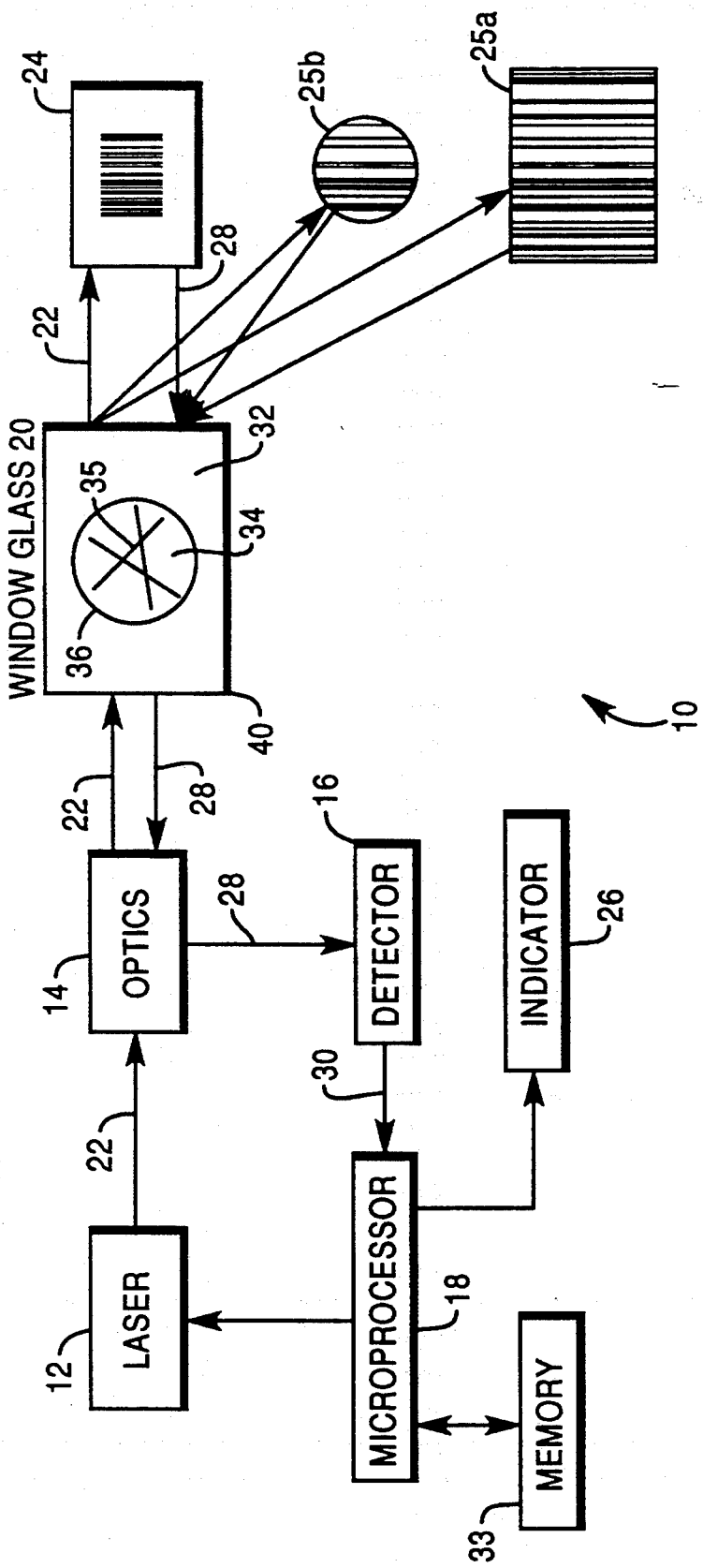
FIG. 1 is a block diagram of the system of the present invention.

Referring now to FIG. 1, system 10 includes laser 12, optics 14, detector 16, processor 18, window glass 20, and indicator 26.

Laser 12 produces beam 22.

Optics 14 route beam 22 through window glass 20 to bar code labels 24, 25a, and 25b. Bar code label 24 is a programming bar code label for placing system 10 in a test mode. Bar code labels 25a and 25b are test pattern labels which are scanned after system 10 is placed in the test mode. Reflected light 28 from labels 24, 25a, and 25b passes through window glass 20 to optics 14, which route reflected light 28 to detector 16.

Detector 16 converts reflected light into electrical signal 30.

Processor 18 receives electrical signal 30 and deciphers the bar code information that it contains. The bar code information is then stored in memory 33. Processor 18 may also control operation of laser 12.

Indicator 26 provides a signal to an operator that window glass 20 should be replaced. Indicator 26 may include a combination of red and green lights or a speaker for producing a series of beeping sounds.

Window glass 20 may become scratched during normal scanning operation. Cans and other items are often brought into contact with window glass 20, thereby causing the damage. Over time, window glass 20 may cause laser beam 22 and reflected light 28 to be scattered to a degree sufficient to prevent bar code information from being deciphered.

Window glass 20 may be divided into passive and active areas 32 and 34 for some types of scanners. Active area 34 passes nearly all of laser beam 22 and reflected light 28. Passive area 32 passes very little of laser beam 22 and reflected light 28. For a standard star pattern 35, active area 34 may have an approximate bound described by circle 36 within perimeter 40 of window glass 20.

Mere visual inspection is not enough to conclusively determine when window glass 20 requires replacing. Scratches or other damage in passive area 32 minimally affect system performance. Therefore, damage in passive area 32 may be ignored. Damage in active area 34 directly affects system performance, and when such damage is excessive window glass 20 must be replaced.

Thus, with reference to FIG. 2, testing method 50 is explained in more detail, beginning with START 52.

In block 53, an operator scans programming bar code label 24 to place system 10 into a test mode.

In block 54, an operator places either test pattern label 25a or 25b over window glass 20 to allow system 10 to scan test pattern label 25a or 25b.

In block 56, processor 18 determines the widths of the light and dark areas of test pattern label 25a or 25b.

In block 58, processor 18 stores the widths in memory 33.

In block 60, processor 18 determines whether a statistically significant sample has been taken. If not, then the method returns to block 54 for another scan until a statistically significant sample is taken.

If a statistically significant sample has been taken, the method proceeds to block 62, in which processor 18 determines the variance of the sample.

In block 64, the method determines whether the variance is above a predetermined threshold obstruction. If the variance is not above the threshold, then the method ends in block 66 without requiring that window glass 20 be replaced. If the variance is above the threshold, then indicator 26 signals the operator to replace window glass 20, before proceeding to end 66. The predetermined threshold differs among scanner types and depends largely on scan pattern type and detection capabilities.

Figure 3A:
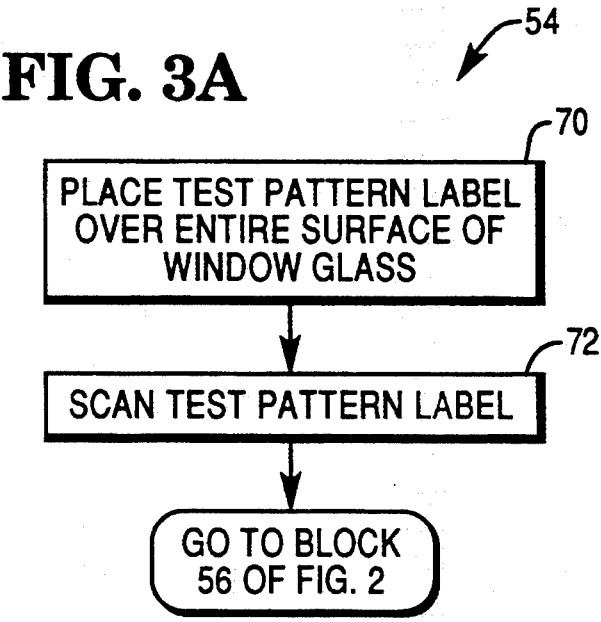
FIGS. 3A and 3B are first and second embodiments of the scanning step of FIG. 2.

With reference to FIG. 3A, a first embodiment of block 54 is shown.

In block 70, test pattern label 25a is placed over window glass 20 so as to cover it entirely.

In block 72, test pattern label 25a is scanned and the method continues with block 56 of FIG. 2.

Figure 3B:
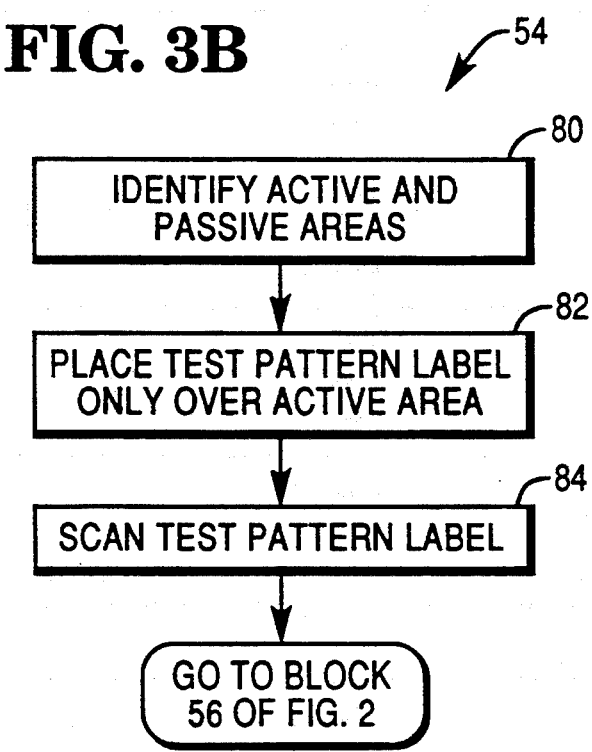

With reference to FIG. 3B, a second embodiment of block 54 is shown.

In block 80, active area 34 and passive area 32 are identified.

In block 82, test pattern label 25b is placed only over active area 34.

In block 84, test pattern label 25b is scanned and the method continues with block 56 of FIG. 2.

Although the present invention has been described with particular reference to certain preferred embodiments thereof, variations and modifications of the present invention can be effected within the spirit and scope of the following claims.

What is claimed is:

1. An optical scanning system comprising:
   a laser beam source;
   a window glass through which the laser beam passes for scanning a bar code label to obtain bar code information and through which light reflected from the bar code label passes, the window glass being susceptible to damage from items coming in contact with the window glass during scanning; and
   a processor which determines the bar code information from the reflected light and which determines whether the window glass is damaged enough that the bar code information cannot accurately be determined.

2. The optical scanning system as recited in claim 1, further comprising:
   a detector coupled to the processor for converting the reflected light into an electrical signal based on the intensity of the reflected light;
   optics for routing the laser beam through the window glass and for routing the reflected light to the detector; and
   a memory coupled to the processor for storing the bar code information.

3. The optical scanning system as recited in claim 1, wherein the laser beam source comprises a laser diode.

4. An optical scanning system comprising:
   a laser diode which produces a laser beam;
   a window glass through which the laser beam passes for scanning a bar code label and through which light reflected from the bar code label passes, the window glass being susceptible to damage from items coming in contact with the window glass during scanning;
   a detector for converting the reflected light into an electrical signal based on the intensity of the reflected light;
   optics for routing the laser beam through the window glass and for routing the reflected light to the detector;
   a processor coupled to the detector which determines the bar code information from the reflected light and which determines whether the window glass is damaged enough that the bar code information cannot accurately be determined; and
   a memory coupled to the processor for storing the bar code information.

5. A method for testing the viability of a window glass in an optical scanner comprising the steps of:
   (a) scanning a test pattern label having light and dark areas a plurality of times;
   (b) determining the widths of the light and dark areas for each scanning step;
   (c) storing the widths of the light and dark areas in a memory for each scanning step;
   (d) determining the variance of the widths;
   (e) comparing the variance to a predetermined threshold; and
   (f) replacing the window glass by an operator if the variance exceeds the predetermined threshold.

6. The method as recited in claim 5, wherein step (a) comprises the substeps of:
   (a-1) placing the test pattern label over the entire surface of the window glass; and
   (a-2) scanning the test pattern label.

7. The method as recited in claim 5, further comprising the step of:
   (g) scanning a programming bar code label before step (a) to place the scanner in a test mode.

8. The method as recited in claim 5, further comprising the steps of:
   (g) determining Whether the stored widths represent a statistically Significant sample before performing step (d); and
   (h) if the stored widths do not represent a statistically significant Sample, performing steps (a)–(c) until the stored widths represent a statistically significant sample.

9. The method as recited in claim 5, wherein step (a) comprises the substeps of:

(a-1) identifying a first area of the window glass through which the laser beam passes substantially always and a second area of the window glass through which the laser beam passes substantially never;

(a-2) placing the test pattern label only over the first area by an operator; and (a-3) scanning the test pattern label.

10. The method as recited in claim 9, further comprising the substep of:

(a-4) disregarding damage to the window glass in the second area detected visually by the operator.

* * * * *